J. H. & R. W. WELCH. 2 Sheets--Sheet 1.

Improvement in Hydraulic and Pneumatic-Motor for Sewing-Machines.

No. 4,882. Reissued April 23, 1872.

Witnesses.

Harry King.

Phil T. Dodge

Inventors.

James H. Welch

Rosia W. Welch.

by Dodges Munn

Attys.

J. H. & R. W. WELCH. 2 Sheets--Sheet 2.

Improvement in Hydraulic and Pneumatic-Motor for Sewing-Machines.

No. 4,882. Reissued April 23, 1872.

Witnesses.

Harry King.

Phil T. Dodge

Inventors.

James H. Welch &

Rosia W. Welch by Dodges Munn

Attys.

UNITED STATES PATENT OFFICE.

JAMES H. WELCH AND ROSIA W. WELCH, OF GEORGETOWN, D. C.

IMPROVEMENT IN HYDRAULIC AND PNEUMATIC MOTORS FOR SEWING-MACHINES.

Specification forming part of Letters Patent No. 121,441, dated November 28, 1871; reissue No. 4,882, dated April 23, 1872.

SPECIFICATION.

*To all whom it may concern:*

Be it known that we, JAMES H. WELCH and ROSIA W. WELCH, of Georgetown, in the county of Washington and District of Columbia, have invented certain new and useful Improvements in Hydraulic and Pneumatic Motor; and we do hereby declare that the following is a full, clear, and exact description thereof, reference being had to the accompanying drawing making part of this specification, and to the letters of reference marked thereon, like letters indicating like parts wherever they occur.

To enable others skilled in the art to construct and use our invention we will proceed to describe it.

Our invention relates to engines or motors intended to be operated by water, but which may also be driven by steam or compressed air, if desired; and the invention consists in a novel construction of the engine, whereby the use of independent or separate valves is dispensed with, and the oscillating cylinder is hung at one end upon a conical trunnion, in which are formed the induction and eduction ports, all as hereinafter more fully explained.

Figure 1:
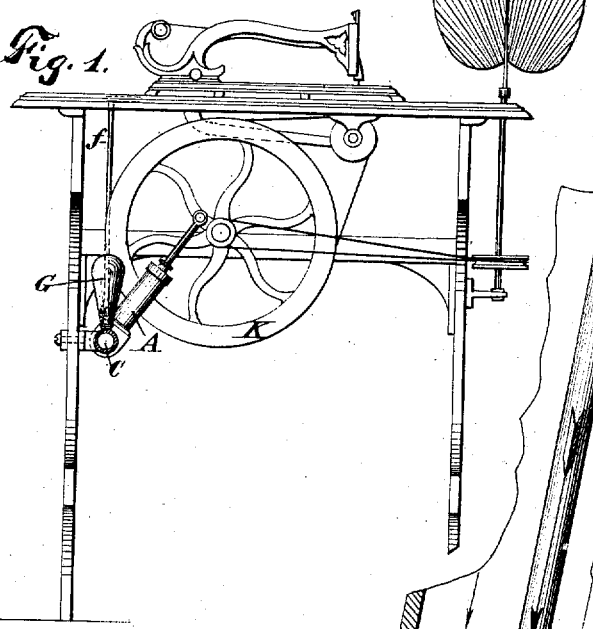
Figure 3:
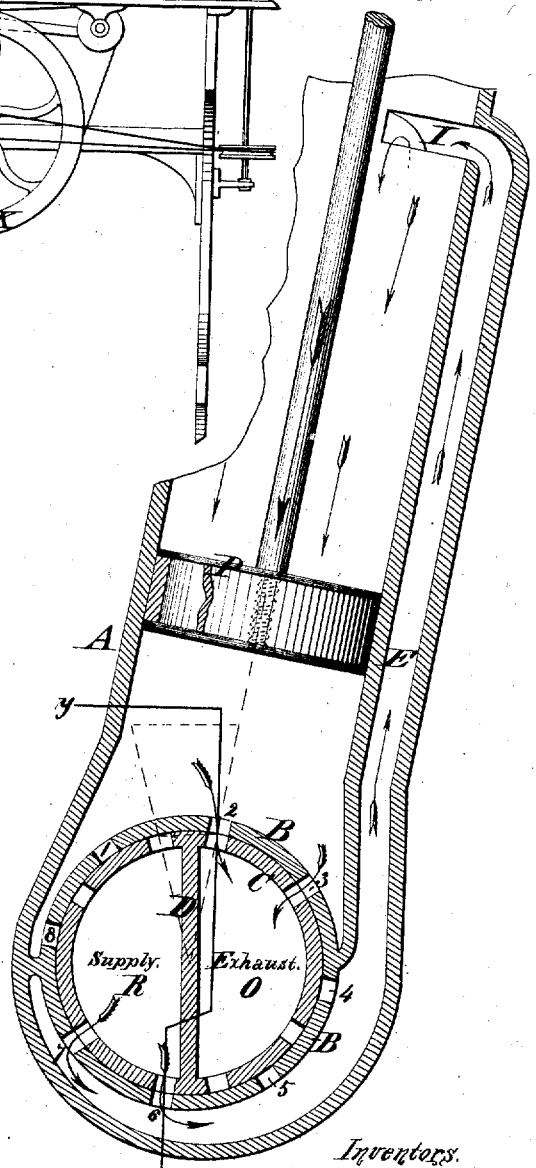
Figure 2:
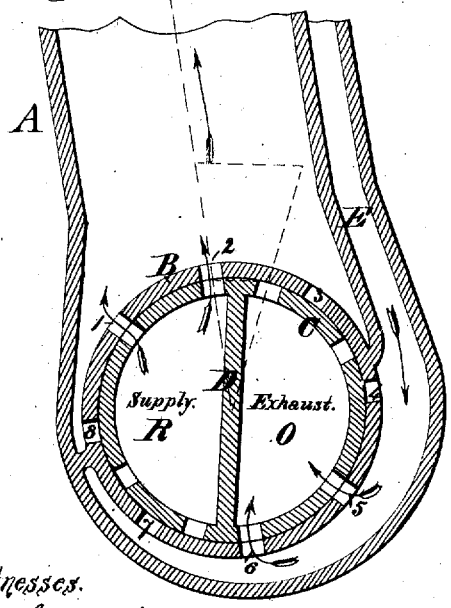
Figure 4:
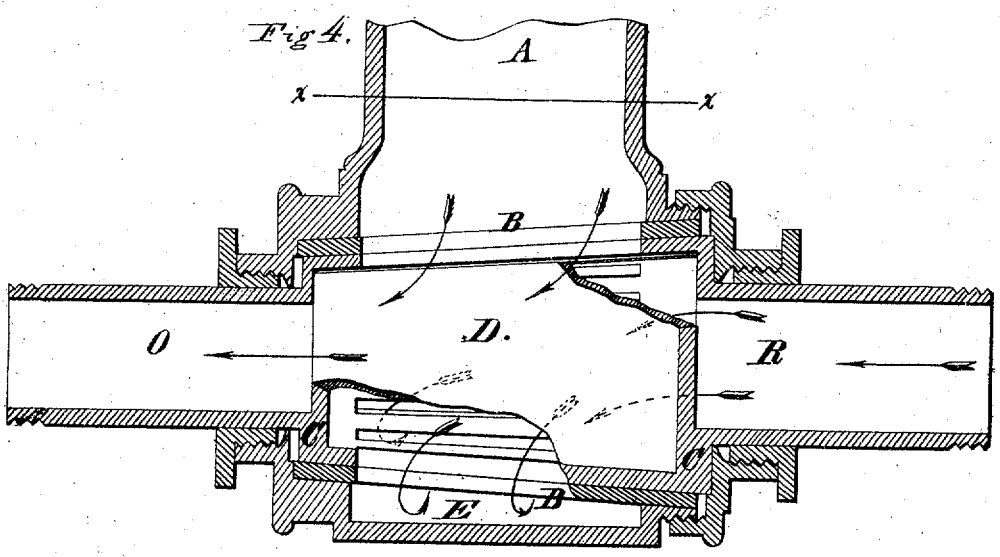
Figure 7:
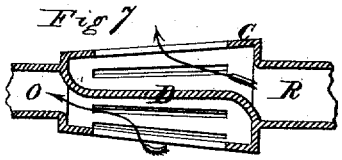
Figure 6:
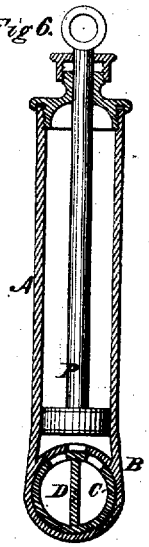
Figure 5:
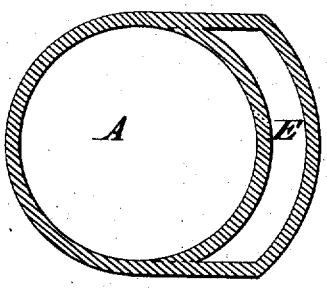

Figure 1 is a front view of a sewing-machine with our motor attached. Figs. 2 and 3 are longitudinal vertical sections of the engine. Fig. 4 is a transverse vertical section on the line *y y* of Fig. 3. Fig. 5 is a transverse section on the line *x x* of Fig. 4. Fig. 6 is a longitudinal vertical section of a single-acting engine constructed on our plan; and Fig. 7 is a sectional view of the trunnion detached.

The object of this invention is to produce a small and cheap motor that can be conveniently used for all household and shop purposes, such as driving sewing-machines, washing-machines, coffee-mills, turning-lathes, and the like.

In constructing our motor or engine we make an oscillating cylinder, A, with a piston, P, the same as for an ordinary steam-engine so far as its general nature is concerned. This cylinder, however, we make at its lower end with a tubular bearing, B, which extends transversely across and through it, and extends for some distance, more or less, at each side, as shown in Fig. 4, so as to afford a long and strong bearing, this bearing B thus forming a tube at right angles to the body of the cylinder A, and constituting the bottom or lower end of the cylinder proper. Internally, this tube B is bored out so as to be conical, as shown in Fig. 4, for the purpose of compensating for any wear that may occur in use, as hereinafter explained. This tube B is so arranged that the walls of the cylinder A are connected to it at opposite points on its sides, as shown in Figs. 2 and 3, thus leaving its upper half to form the bottom of the cylinder, its lower half forming the inner wall at that point of a passage, E, which extends from thence up along the outside of the cylinder A, and communicates with the upper end of the cylinder by an opening, I, at that point, as shown in Fig. 3.

Having thus constructed the cylinder, we then provide a conical trunnion, C, which is inserted in the tubular bearing or box B, and on which the cylinder oscillates, it forming the sole support therefor. This trunnion is made hollow, in the form of a pipe, as shown in Figs. 2, 3, 4, 6, and 7, and has in that portion which fits within the bearing B a partition, D, which divides it longitudinally into two parts; this partition, starting from one side and extending transversely half-way across or nearly so, then extending lengthwise the required distance, and turning at right angles again, unites to the opposite side, as represented more clearly in Fig. 7. Through the walls of this trunnion we cut a series of elongated openings or slots, as shown in Fig. 4, and in section in Figs. 2, 3, and 6; one half of these slots, which constitute ports, being on one side of the partition D and the other half being on the opposite side, and being correspondingly located, there being a similar and corresponding series of ports formed in the tubular bearing or box B, as represented in Figs. 2, 3, 4, and 6.

The trunnion, instead of being hollow, with openings through its sides, may be made solid at the center, and have grooves or channels formed in its exterior for the passage of the water or steam, and be made to operate the same.

The trunnion C being thus constructed is inserted in the bearing B, the two being fitted accurately so as to be water or steam tight, and the trunnion C is then secured, by its projecting ends, firmly and rigidly to any suitable frame or bed piece—the box B being kept from moving endwise thereon by rings or screws at each side, or by any other suitable means. The piston then being inserted, and the upper end of the cylinder closed in the usual manner, is connected to the crank of the balance or driving-wheel, the same as in an ordinary oscillating steam-engine, and the motor is complete, a valve or cock, of course, being inserted in the supply-pipe at any convenient point to let on and shut off the water or steam, as the case may be.

The operation is as follows: Water being admitted through the end R of the trunnion C, flows in on the supply side of the partition D, and passing through the ports 1 and 2, as represented in Fig. 2, thus forcing up the piston, the water that was above the piston at the same time passing out of the cylinder through the opening I at the upper end, thence down the passage E, and through ports 5 and 6, into the exhaust-passage O on the opposite side of partition D, and thence out through the waste-pipe. As the motion of the crank causes the cylinder to oscillate to the opposite side the ports 2 and 3 are carried over to the opposite side of the partition D, where they come opposite the ports in the trunnion on that side, thereby permitting the water that forced up the piston to flow out into the exhaust side O of the trunnion, the ports 7 and 8 at the same time being opened and permitting water from the supply side R to flow into the chamber or passage E, and from thence through the opening I, against the opposite side of the piston, thus driving it down again. In this way a continuous reciprocating motion is imparted to the piston.

From this explanation it will be readily perceived that the number of ports in the trunnion and the bearing or box B may be more or less, as may be found convenient. For instance, there need be but two ports in the part B—one opening upward into the cylinder, and one below opening into the passage E. With such an arrangement there must be four ports in the trunnion—two on the supply side and two on the exhaust side—so that as the cylinder oscillates the ports in part B will correspond with one on each side of the trunnion, and when moved to the opposite side will correspond with the opposite pair. This arrangement of the ports as applied to a single-acting engine is shown in Fig. 6—the water being taken on one side of the cylinder only. Of course, in a single-acting engine there need be but one port in the part B, and one on each side of the partition D in the trunnion, the water entering the cylinder from the supply side when the cylinder is swung over to correspond with the port on that side, and discharging through the same port in B when the cylinder is swung to the opposite side, so as to bring its port in line with that of the trunnion on the discharge side of the partition.

The object of increasing the number of the ports, as represented in Figs. 2, 3, and 4, is to distribute them more equally over the surface of the bearing parts, and thus equalize the wear, so as to prevent them from wearing unequally, and at the same time permit a free and speedy entrance and discharge of the water.

By properly adjusting or setting the trunnion the ports may be made to open and close sooner or later, as may be desired, and thus when operated by steam, compressed air, or similar elastic fluid or vapor, the same can be used expansively, as is now done in many forms of steam-engine.

It will, of course, be understood that to reverse the engine it is only required to cause the water to enter at the opposite end of the trunnion.

By these means we are enabled to produce an exceedingly cheap and simple engine or motor, which is admirably adapted for household uses, it being entirely free from cams, gearing, sliding valves, or other complicated parts, and therefore capable of being operated by any person of ordinary intelligence. The cock or valve that regulates the admission of the water, steam, or air may be located in the pipe on either side of the engine—it is immaterial which—because, whenever it is closed the water or steam cannot pass through the engine and it therefore ceases to operate.

An engine thus constructed can be applied to sewing-machines with great facility, the base or trunnion being clamped to the legs or frame of the machine, and the piston attached directly to the balance-wheel K of the machine, as represented in Fig. 1. If desired, an air-chamber, G, may be attached to the pipe when water is used as the motive power, to assist by its elasticity in equalizing the pressure; but this we do not consider important or necessary, especially when double-acting engines are used, and which from their greater efficiency will generally be preferred.

Having thus described our invention, what we claim is—

1. A cylinder for an oscillating engine, provided with a transverse tubular bearing or box B, having ports or passages formed therein, substantially as described.

2. In combination with the above-described cylinder, we claim the hollow trunnion C, with the induction and eduction ports formed therein, substantially as set forth.

3. We claim an oscillating engine provided with a conical bearing, substantially as described, whereby the same can be adjusted to compensate for wear and thus keep the joints tight, as herein described.

JAMES H. WELCH.
ROSIA W. WELCH.

Witnesses:
J. McKENNEY,
W. C. DODGE.